(12) United States Patent
Venkatavaradan et al.

(10) Patent No.: US 9,071,506 B2
(45) Date of Patent: Jun. 30, 2015

(54) ACCESSING WEB SERVICES USING NETWORK MANAGEMENT INFORMATION

(75) Inventors: Ragunathan Venkatavaradan, Bangalore (IN); Bhaskar Vasudevan, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 1350 days.

(21) Appl. No.: 11/819,990

(22) Filed: Jun. 29, 2007

(65) Prior Publication Data

US 2008/0028085 A1 Jan. 31, 2008

(30) Foreign Application Priority Data

Jul. 31, 2006 (IN) ............................ 1338/CHE/2006

(51) Int. Cl.
*G06F 15/173* (2006.01)
*H04L 12/24* (2006.01)
*H04L 29/08* (2006.01)

(52) U.S. Cl.
CPC ........ *H04L 41/0213* (2013.01); *H04L 41/5003* (2013.01); *H04L 41/5058* (2013.01); *H04L 67/16* (2013.01); *H04L 67/02* (2013.01)

(58) Field of Classification Search
USPC ........................................................ 709/229
See application file for complete search history.

(56) References Cited

U.S. PATENT DOCUMENTS

| 6,892,235 | B1* | 5/2005 | Daude et al. ................. 709/224 |
| 7,099,277 | B2* | 8/2006 | Sahinoglu et al. ............ 370/238 |
| 7,392,325 | B2* | 6/2008 | Grove et al. .................. 709/238 |
| 7,510,113 | B2* | 3/2009 | Igarashi et al. ............... 235/379 |
| 2001/0023451 | A1* | 9/2001 | Hericourt ...................... 709/232 |
| 2003/0188039 | A1* | 10/2003 | Liu et al. ....................... 709/315 |
| 2003/0233602 | A1* | 12/2003 | Lindquist et al. .............. 714/47 |
| 2004/0054777 | A1* | 3/2004 | Ackaouy et al. .............. 709/225 |
| 2005/0044197 | A1* | 2/2005 | Lai ................................ 709/223 |
| 2005/0071421 | A1* | 3/2005 | Calo et al. ..................... 709/203 |
| 2005/0188091 | A1* | 8/2005 | Szabo et al. ................... 709/227 |
| 2006/0047742 | A1* | 3/2006 | O'Neill et al. ................. 709/203 |
| 2007/0143496 | A1* | 6/2007 | Golovinsky et al. .......... 709/238 |

OTHER PUBLICATIONS

Menasce, Daniel. "Composing Web Services: A QoS View." IEEE Internet Computing. pp. 88-90. Published Dec. 2004.*
"Responsiveness" downloaded from <http://en.wikipedia.org/wiki/Responsiveness> on Aug. 14, 2014.*

* cited by examiner

*Primary Examiner* — Scott B Christensen
(74) *Attorney, Agent, or Firm* — Alleman Hall McCoy Russell & Tuttle (57) ABSTRACT

A method is provided of accessing a web service by means of a service client in an IT-network. The method includes determining a set of access information data indicating different possibilities of how the web service may be accessed. The different access possibilities indicated by the access information data using network management information relating to the access possibilities are evaluated. Access information data according to the evaluation result is selected, and the web service is accessed.

7 Claims, 6 Drawing Sheets

*Fig. 6*

ACCESSING WEB SERVICES USING NETWORK MANAGEMENT INFORMATION

This application claims priority from Indian patent application 1338/CHE/2006, filed on Jul. 31, 2006. The entire content of the aforementioned application is incorporated herein by reference.

FIELD OF THE INVENTION

The present invention generally relates to methods, systems and computer program products for accessing a web service, and for example, to methods, systems and computer program products for accessing a web service using network management information.

BACKGROUND OF THE INVENTION

During the last decades, the Internet has become ubiquitous by leveraging the World Wide Web, invented by Tim Berners-Lee in 1989, which is nowadays used as a main source of information all over the world. Typically, users access a web server containing the documents they wish to read by means of a service client. The protocol used for accessing the web server is mostly HTTP (hypertext transfer protocol) and the documents are often stored in an html-format. HTML is a format for representing information in a structure that allows for establishing links between the individual documents so that all documents together form a hypertext document structure.

The Internet may also be understood as a network structure including many local area networks (LAN). To provide security measurements so that no data leaves the local area network, firewalls are configured that implement security strategies which guarantee that a security policy with regard to the incoming and outgoing data traffic is complied with.

Frequently, when a user accesses a web server which is beyond the local area network a proxy server is used which stores the contents of web sites that have been visited recently. Thus, the actual web server does not have to be accessed several times, but only a proxy server needs to be accessed. However, the web sites stored on the proxy server may be out-dated after some time, so that the information received loses its value for the user. A proxy device (running either on dedicated hardware or as software on a general-purpose machine) may act as a firewall by responding to input packets (connection requests, for example) in the manner of an application, whilst blocking other packets.

The user of proxies makes it more difficult to tamper with an internal system from the external network, and any misuse of one internal system would not necessarily cause a security breach exploitable from outside the firewall (as long as the application proxy remains intact and properly configured).

A web service is a software application that is identifiable by means of a uniform resource locator and whose interfaces are defined and described as XML-artefacts. A web service supports the direct interaction with other software agents by using XML-based message by the exchange of internet-based protocols.

Businesses now expect their Internet service providers and internal IT departments to provide clear service level guarantees on the availability and response time of the services they provide, along with notifications and resolutions of outages and slowdowns. The term "quality-of-service" (QoS) refers to providing a user who wishes to make use of an IT-infrastructure and services available on that IT-infrastructure with a guarantee concerning the service provided. In a contract which is usually referred to as a "service level agreement" (SLA), the service provider and the service customer agree upon failure times, response times, etc. during the runtime of the SLA. An SLA which allows a service provider to deliver its services with relatively long response times may be less expensive for a customer than an SLA guaranteeing short response times.

SUMMARY OF THE INVENTION

A method is provided of accessing a web service by means of a service client in an IT-network. The method includes determining a set of access information data indicating different possibilities of how the web service may be accessed. The different access possibilities indicated by the access information data are evaluated using network management information relating to the access possibilities. Access information data is selected according to the evaluation result, and the web service is accessed.

According to another aspect, a computer system is provided for accessing a web service by means of a service client in an IT-network. The computer system is programmed to determine a set of access information data indicating different possibilities of how the web service may be accessed. The different access possibilities indicated by the access information data are evaluated using network management information relating to the access possibilities. Access information data is selected according to the evaluation result, and the web service is accessed.

According to another aspect, a computer program product is provided which is either in the form of a machine-readable medium with program code stored on it, or in the form of a propagated signal including a representation of program code. The program code is arranged to carry out a method, when executed on a computer system, of accessing a web service by means of a service client in an IT-network. The method includes determining a set of access information data indicating different possibilities of how the web service may be accessed. The different access possibilities indicated by the access information data are evaluated using network management information relating to the access possibilities. Access information data is selected according to the evaluation result, and the web service is accessed.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

The drawings and the description of the drawings are of embodiments of the invention and not of the invention itself.

DESCRIPTION OF THE PREFERRED EMBODIMENTS

Figure 1:
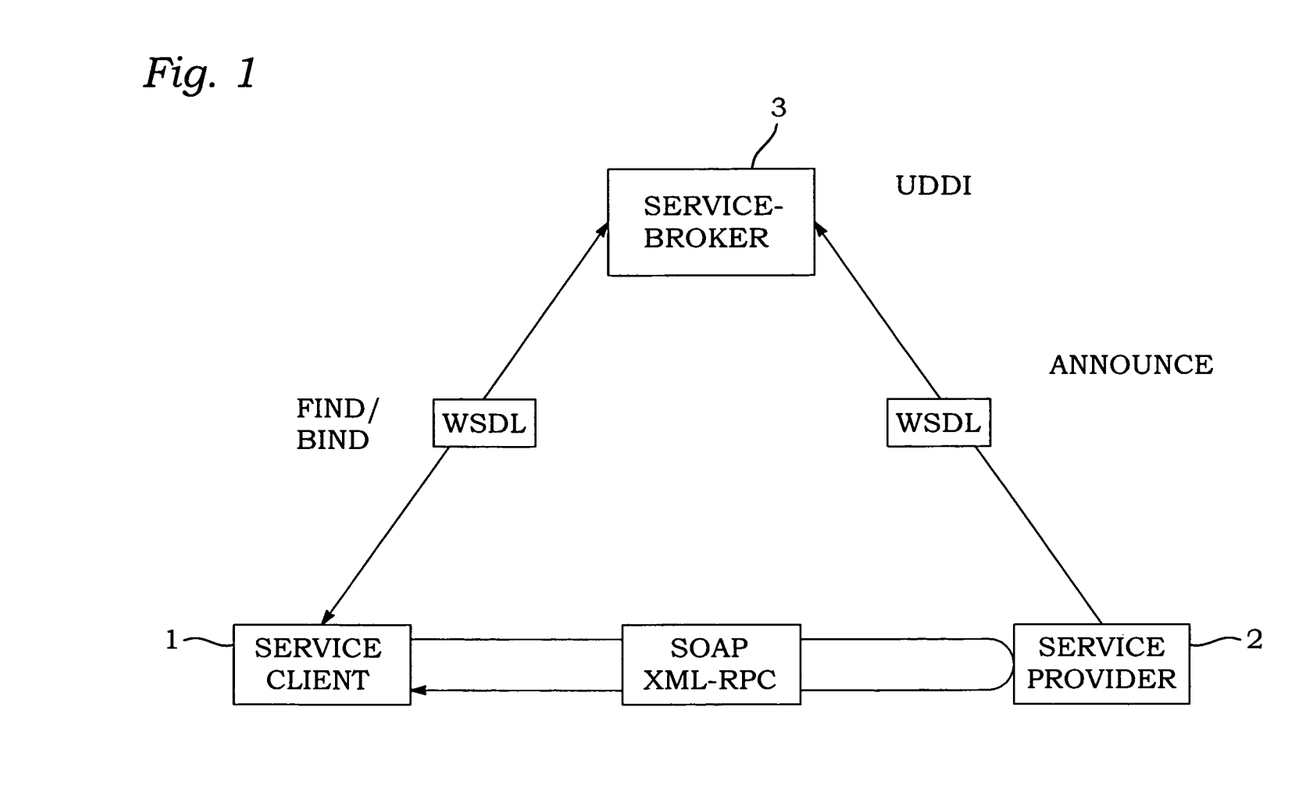
FIG. 1 shows a high-level architecture for web service applications according to embodiments of the invention.

FIG. 1 shows a high-level architecture of a web service application. However, before proceeding further with the description of FIG. 1 a few items will be discussed.

In some of the embodiments, a web service is accessed by means of a service client in an IT-network. The method includes determining a set of access information data indicating different possibilities of how the web service may be accessed. Then, the different access possibilities indicated by the access information data are evaluated using management information relating to the access possibilities. Access information data is selected according to the evaluation result, and the web service is accessed.

The term "web service" as used herein refers to a software system designed to support interoperable machine-to-machine interaction over a network. It has an interface that is described in a machine-processable format such as WSDL (web service description language). Other systems interact with the web service in a manner prescribed by its interface using messages, which may be enclosed in a SOAP (Simple Object Access Protocol)—envelope. (SOAP is a protocol based on HTTP by means of which data between systems may be exchanged, and remote procedure calls may be performed.) These messages are typically conveyed using HTTP, and normally comprise XML in conjunction with other web-related standards. Software applications written in various programming languages and running on various platforms can use web services to exchange data over computer networks like the Internet in a manner similar to inter-process communication on a single computer. It should be mentioned that although the term "web" is closely related to HTTP, a web service may also be based on other protocols, for example on SMTP or FTP.

The term "access information data" as used herein includes at least one of the two types of information:

binding information, which refers to binding a client computer to a service. A binding component describes a concrete message format and transmission protocol which may be used to access a web service. That is, a binding component defines the implementation details necessary to access the web service. It includes information about the server on which the service is located, a uniform resource locator (URL) and the protocol used for accessing the server, for example SOAP, HTTP, SMTP, JMS (Java Message Service). This information may be derived from the WSDL-description of the web service. Different bindings may have different performance characteristics.

service path information, which refers to a path set of intermediate servers (proxy servers) via which the service may be accessed. Different service paths may have different performance characteristics.

In the context of web services, a user selects in a register a service from a list of services. Then, the user is bound to the selected service. A description of the service (in WDSL) which includes the binding information is sent to the user which accesses the service according to the binding information indicated in the WDSL-description.

The expression "selecting access information data" refers to selecting a subset of access information data from the entire access information data. The selected access information data represents an appropriate access possibility with regard to external constraints, such as a service-level agreement.

In some of the embodiments, the web service is not directly accessed on the actual server but one or more intermediate servers are located between the user and the server. These intermediate servers are also referred to as proxy servers and may buffer the web service. Depending on which proxy server is used to access the web service, a different performance may be obtained. Therefore, in some of the embodiments, the access information data contains a service path information indicating via which proxy servers the web service is accessed.

The term "intermediate server" as used herein relates to any type of server in which data may be cached. Typically, this type of intermediate server is also referred to as proxy server or proxy. A proxy server is a computer that offers a computer network service to allow clients to make indirect network connections to other network services. A client connects to the proxy server, and then requests a connection, file, or other resource available on a different server. The proxy provides the resource either by connecting to the specified server or by serving it from a cache. In some cases, the proxy may alter the client's request or the server's response for various purposes. A proxy server may also serve as a firewall.

A common proxy application is a caching web proxy. This provides a nearby cache of web pages and files available on remote web servers, allowing local network clients to access them more quickly or reliably. When it receives a request for a web resource (specified by a URL), a caching proxy looks for the resulting URL in its local cache. If found, it returns the document immediately. Otherwise it fetches it from the remote server, returns it to the requester and saves a copy in the cache. The cache usually uses an expiry algorithm to remove documents from the cache, according to their age, size, and access history. Two simple cache algorithms are Least Recently Used (LRU) and Least Frequently Used (LFU). LRU removes the documents that have been left the longest, while LFU removes the least popular documents. The algorithms can also be combined together.

A proxy server stands between a service client and the server providing the web service. When a service client tries to access a web service located on a server, the request is sent to the proxy server. The proxy server maintains a cache containing recently accessed web services. When the proxy server receives the request, it checks the cache for the existence of the web service. If it is stored in the cache, it is sent back to the service client. However, if the service is not stored in the cache, the proxy server retrieves the web service from the Internet, copies it to the cache, and then sends it to the service client. It should be mentioned that each proxy server is only capable of servicing a limited number of requests before it begins to get bogged down. Therefore, it is possible to use multiple proxy servers in the IT-network in chains. The word "chain" may be misleading. A proxy server chain actually functions more like a pyramid. To have some idea of what this concept looks like, one must recall how a DNS server works. There are millions of Internet users, and they all depend on a DNS server to resolve domain names. Therefore, most ISPs provide at least a few DNSs to their clients. When a client needs to resolve a name, it checks the DNSs for a record of the name. If the record does not exist, the DNS forwards the request to a higher DNS. If this DNS contains a record of the name, it is sent back down the "chain" to the lower DNS. If it does not, the request is passed on to an even higher DNS, and this process continues until a DNS server containing the desired information is found. This is almost exactly how a proxy server chain works. In a company with several locations, there may be thousands of users at each location. All of these users depend on a proxy server for Internet connectivity. Since it would be inappropriate to have a single proxy server to service all requests, one proxy server may be assigned to every few hundred users. A proxy server may be assigned to each location and a master proxy server may be assigned to maintain the actual Internet gateway. If a service client tries to access a web service, it will check its local proxy server first. If the local proxy server's cache does not contain a copy of the web service, the request will be sent up the line to the facility's proxy server. If that proxy server does not contain a copy of the web service, the request will be passed to the master proxy server. If the master proxy server does not contain the desired information, it will retrieve it from the Internet and send the information back down the line, where it will be written to each proxy server's cache involved, before being passed to the service client that requested it.

In some of the embodiments, the access information data includes a set of different service paths with at least one proxy server via which the web service may be accessed. Since in some of the embodiments the proxy servers are connected with each other, several paths may be traversed to access a server. Hence, different paths need to be evaluated to determine which path should be selected to access a web service.

In other embodiments, the access information data is binding information for a web service. As mentioned above, binding information indicates for example which protocol and/or URL is to be used to access a web service.

In some of the embodiments, the access information data is both the binding information and the different service paths which may be used to access a web service.

In some of the embodiments, the access information data is evaluated using network management information. In order to obtain access information data indicating, for example, the service path with the least response time, individual proxy servers are queried by a network management application which is equipped with a data collector for collecting management information coming from the individual proxy servers. The management information is transmitted via SNMP, which is a network management protocol based on a manager which is a central management information collector (data collector) that requests management information from the network nodes on which management agents are located. The management information is stored in management information databases on the network nodes (here: proxy servers). The network management information obtained from the individual servers is used to evaluate different service paths. The service path which seems most appropriate is used for configuring the service client. Thus, the service client then is informed of how to access the desired web service. It should be mentioned that the service path information is independent of the binding information.

In other embodiments, the selection of access information data according to the evaluation result is based on service level agreements. Nowadays, it is common practice that a service provider and a client agree upon a service level agreement in which they record the conditions under which a service is to be provided to a client. This means, for example, that a service path including proxy servers with a relatively long response time is provided for a client who purchased a service on a silver level ("Silver Card") which offers worse guarantees in comparison to a "Gold Card" or "Platinum Card" referring to service levels for discerning customers who are willing to pay high amounts of money for a high quality-of-service. These service levels are interesting in particular for applications which require a high availability and do not accept any failures.

In some of the embodiments, the network management information is information about service paths. When evaluating the different service paths that are available to access the web service, graph-theoretical algorithms are employed. In some of the embodiments, Dijkstra's single-source-shortest path algorithm (cf. for example, Cormen, T. et al.: "Introduction to Algorithms", p. 527-532, MIT Press, 1999) is used to determine the shortest path to obtain the service path for accessing the web service. It should be mentioned that in some of the embodiments it is not the shortest or best path which should be used to access a web service but the service path which is most appropriate with regard to the service level agreement between the user and the service provider.

Some of the embodiments of the computer program product with program code for performing the described methods include any machine-readable medium that is capable of storing or encoding the program code. The term "machine-readable medium" shall accordingly be taken to include, for example, solid-state memories and, removable and non-removable, optical and magnetic storage media. In other embodiments, the computer program product is in the form of a propagated signal including a representation of the program code, which is increasingly becoming the usual way to distribute software. The signal is, for example, carried on an electromagnetic wave, e.g. transmitted over copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

Returning now to FIG. 1 which shows a high-level architecture of a web service architecture. A service client 1 sends a request to a web service which replies with the desired information. It is therefore sometimes said that web services are for computers what web sites are for human beings. Even if this only describes a small proportion of the possibilities of web services, this comparision is appropriate. Web services were not conceived for a human user, but for software systems which exchange data automatically and call procedures on remote computers. A service provider 2 publishes in a directory (here: a service broker 3) the description of his/her services. After some protocol details have been exchanged, a dynamic binding of the service client 1 to the service provider 2 takes place. The service broker 3 is informed about the binding between the service client 1 and the service provider 2. Web services are based on the following three standards each of which is based on XML:

UDDI is a registry service for registering web services. It allows for a dynamic finding of the web service.

WSDL is used for describing the supported methods and the parameters for the programmer. A web service may support multiple bindings which are discoverable via WSDL. The bindings could be of the same type (HTTP/SOAP) or could be of different types (Email/SOAP/JMS). Different bindings may have different performance characteristics.

SOAP (or XML-RPC) is used for the actual communication.

Figure 2:
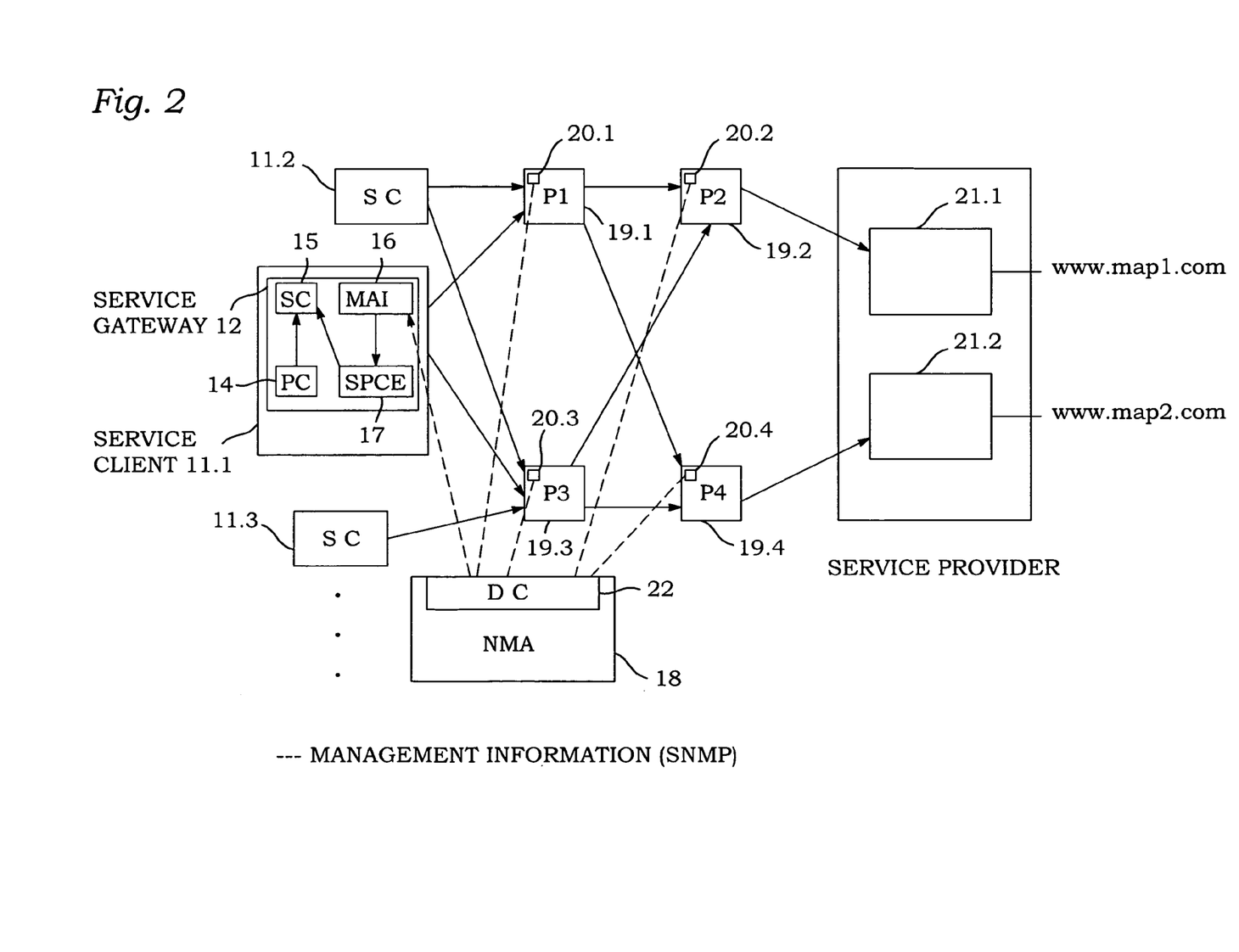
FIG. 2 shows an IT-network, on which embodiments of the invention are based, including proxy servers containing probes for transmitting management information.

FIG. 2 shows a high-level abstraction of an IT-network. A service client 11 requests a service from a service gateway 12 which is a plug-in for a service client 13. Service clients 11.2 and 11.3 are shown to indicate that different policies may be used for the different service clients. The service gateway 12 located on the service client 11.1 acts as an intermediary which transparently chooses the binding/channel of the service as well as a service path. A service path is the set of proxies via which the web service may be obtained. The service gateway 12 mainly depends on two factors:

(1) a business/policy factor which determines what level of service has to be offered to the end user, and (2) a performance factor which gives metrics about performance, availability of a given service path or its binding.

For the business/policy factor, the service gateway 12 has to interface with a customer-relationship-management component of the enterprise.

For the performance factor, the service gateway 12 has to rely on metrics obtained from proxy servers on the service path from the service gateway to the actual servers 21.2 and 22.2. The metrics are collected by a network management application 18, such as OpenView Internet Services. The network management application 18 is equipped with a data collector 22 which collects management information from proxy servers 19.1-19.4. The proxy servers 19.1-19.4 have a probe which measures and stores management information, such as response time or availability. The management information is stored in a management information base. (MIB) from which the data may be transmitted to the data collector 22 of the network management application 18. The protocol used for transmitting the data is SNMP which stands for Simple Network Management Protocol.

The service gateway 12 includes a service configurator 15 which is the component where a service path is configured via which a service is accessed. In other words, it configures a binding between a web service, such as a map service and an actual path of proxies and end-servers to access the service.

A "binding" is a description which indicates how to get access to a certain web service. For web services the description could be directly derived from a WSDL-file (web services description language) specified in UDDI which is an acronym for Universal Description, Discovery, and Integration—a platform-independent, XML-based registry for businesses worldwide to list themselves on the Internet. UDDI is an open industry initiative enabling businesses to publish service listings and discover each other and define how the services or software applications interact over the Internet.

A management applications interface 16 is provided which defines an interface to a network management application 18. The network management application 18, in the example OV IS (OpenView Internet Services), collects management information from the network nodes to be monitored. HP OpenView Internet Services offers a single integrated view of the complete Internet infrastructure. It is designed to help IT staff predict, isolate, diagnose, and troubleshoot problem occurrences, anticipate capacity shortfalls, and manage and report on service level agreements. To this end, the proxy servers 19.1-19.4 are equipped with probes 20.1-20.4 which measure relevant management information in the proxy servers 19 and transmit the data to the network management application 18 which hands the data over to the management application interface 16. Thus, the management application interface 16 knows the costs of the individual nodes in the paths to be evaluated by the service path-cost-estimation component. The management information is then evaluated in a service path-cost-estimation component 17 that evaluates different paths within the network and determines an appropriate path via which the data is accessed. This path is retained in the service configurator 15. Furthermore, a policy component 14 is provided which specifies how to choose a path for a specific client or a client group. This is a hard-coded rule or it could interface with a CRM (customer-relationship-management) component of the enterprise.

Figure 3:
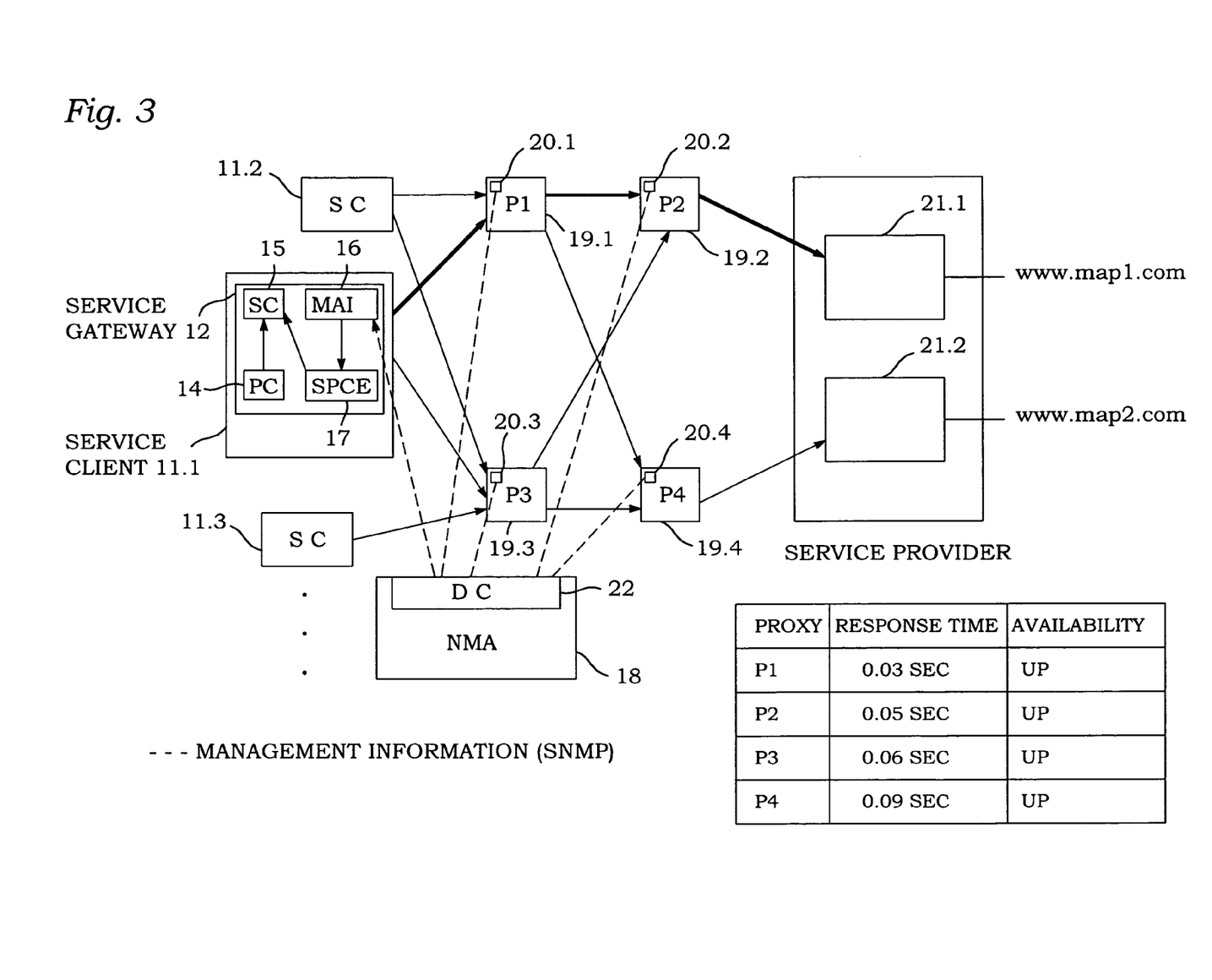
FIG. 3 shows the IT-network of FIG. 2, in which a service path has been determined based on network management information, according to embodiments of the invention.

FIG. 3 shows the same IT-network as FIG. 2, but now a service path has been marked which indicates in which sequence the proxy servers are queried for a service. Concerning the binding information data for the web service, SOAP has been determined as the protocol to be used, and the URLs www.map1.com and www.map2.com are available for the map-service requested. This information has been obtained by trying to access the web service via several binding information data and evaluating the management information received at the network management application 18. The several binding information data are obtained, for example, from the information broker which provides a set of binding information data.

Now, the service path information is determined based on the management information stored in the individual proxy servers 19.1-19.4 which send their response time and availability to the data collector 22 of the network management application 18. Since the network management application 18 determines that proxy server P1 19.1 and proxy server P2 19.2 have the lowest response time, and both proxy servers are up, a service path is established which goes from the service client 11.1 to the proxy server 19.1 and from the proxy server 19.1 to the proxy server 19.2. Proxy server 19.2 caches information from the web service located on web server 21.1 under the URL www.map1.com.

Figure 4:
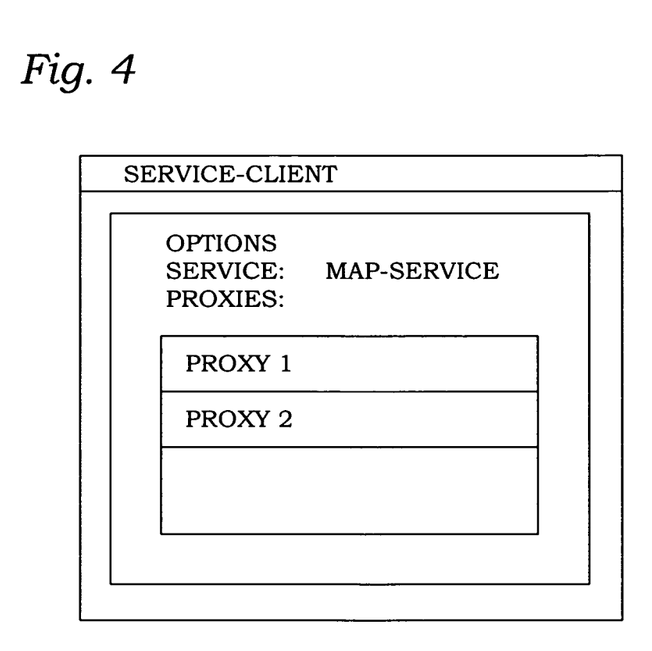
FIG. 4 shows a menu in a service client in which a service path is configured, according to embodiments of the invention.

FIG. 4 illustrates an Options-menu in the service client 11.1 in which the two proxy servers "proxy 1" and "proxy 2" are configured as a service path for accessing a map-service. This service path means that first proxy 1 19.1 and then proxy 2 19.2 is traversed to access the web service.

Figure 5:
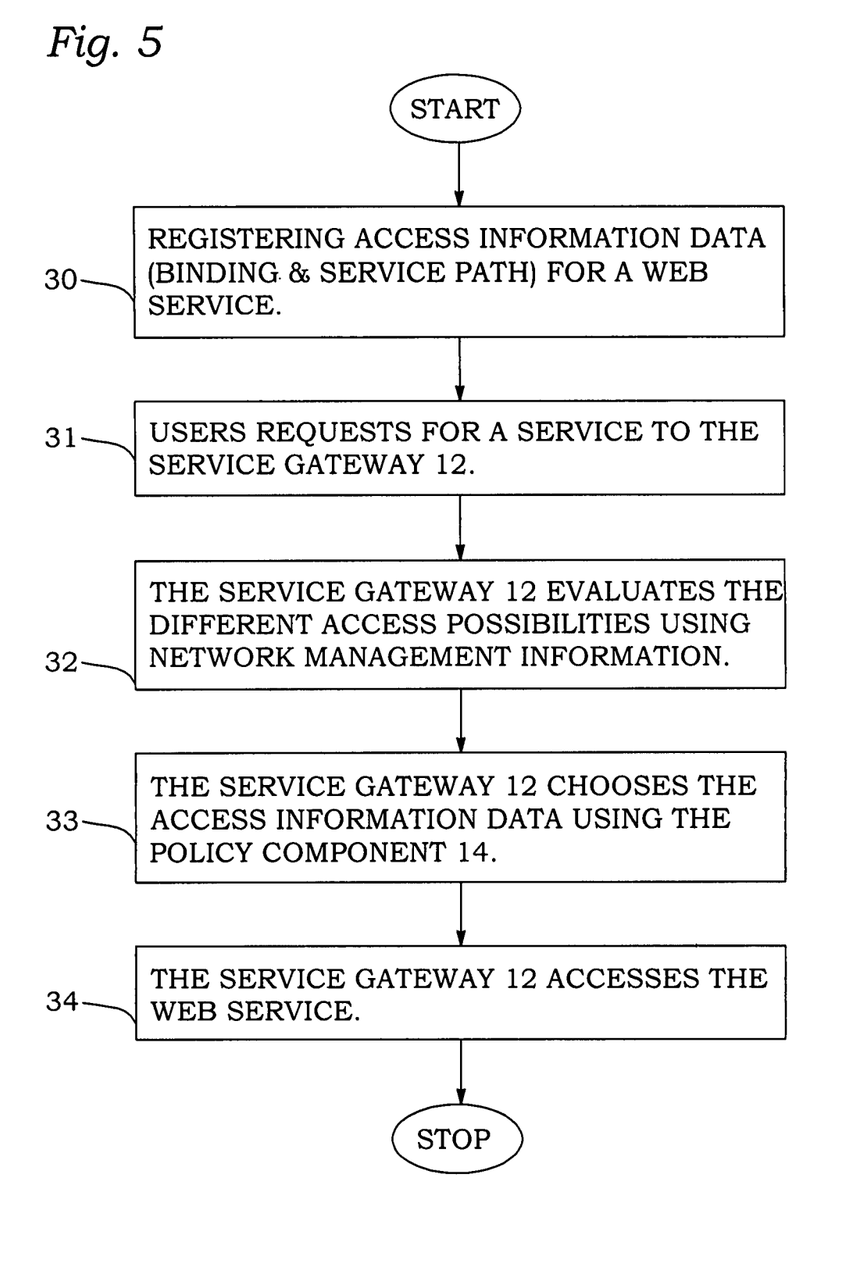
FIG. 5 shows a flowchart indicating a course of action for accessing a web service, according to embodiments of the invention.

FIG. 5 illustrates a flowchart indicating a course of action according to embodiments of the invention. At 30, access information data (i.e. binding and service path information) is registered for a web service. At 31, a user makes a request for a web service to the service gateway 12. At 32, the service gateway 12 evaluates the different access possibilities using network management information relating to the access possibilities. At 33, the service gateway 12 chooses the access information data using the policy component 14. Subsequently, at 34, the service gateway 12 accesses the web service according to the chosen access information data.

Figure 6:
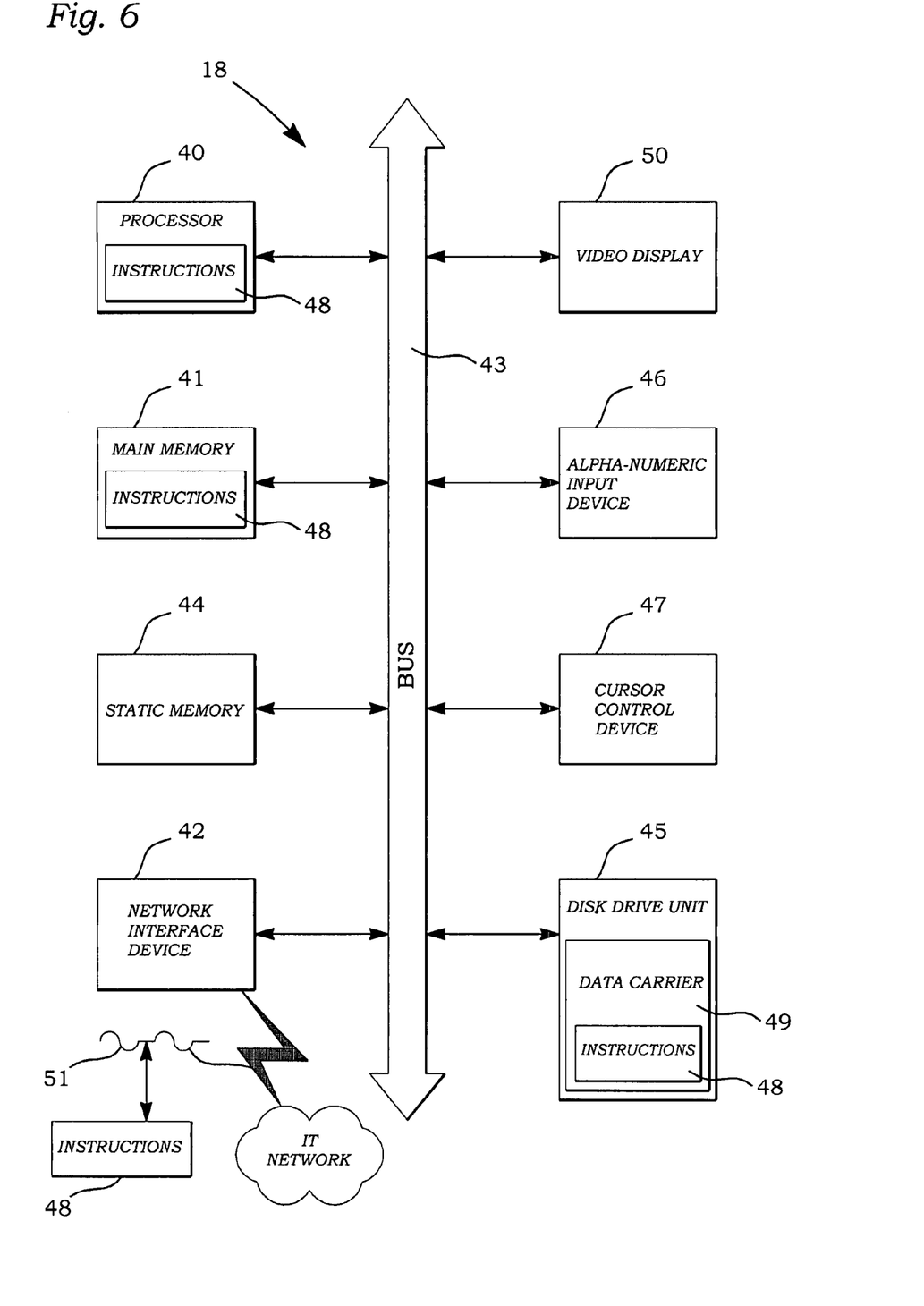
FIG. 6 is a diagrammatic representation of an embodiment of a network management application, according to embodiments of the invention.

FIG. 6 is a diagrammatic representation of a computer system which provides the functionality of the network management application 18 of FIG. 1, and is therefore denoted as "network management computer system 18". Within the network management computer system 18 a set of instructions 48 for causing the computer system to perform any of the methodologies discussed herein, may be executed. The network management computer system 18 includes a processor 40, a main memory 41 and a network interface device 42 which communicate with each other via a bus 43. Optionally, it may further include a static memory 44 and a disk drive unit 45. A video display 50, an alpha-numeric input device 46 and a cursor control device 47 may form a network management computer system 1 to the probes 20 and the managed IT infrastructure. A set of instructions (i.e. software) 48 embodying any one, or all, of the methodologies described above, resides completely, or at least partially, in or on a machine-readable medium, e.g. main memory 41 and/or the processor 40. A machine-readable medium on which the software 48 resides may also be a data carrier 49 (e.g. a non-removable magnetic hard disk or an optical or magnetic removable disk) which is part of disk drive unit 45. The software 48 may further be transmitted or receceived as a propagated signal 51 via the Internet and the IT-network through the network interface device 42.

Thus, the embodiments of the invention described above enable the selection of a service path to access a web service located on a web server. The selection may be based on management information, such as response time or failure time, or on a quality-of-service related data agreed upon in a service level agreement.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of accessing a web service using a service client in an IT-network, the method comprising:
   receiving a request from a user for said web service at a service gateway, said service gateway located on said service client acting as an intermediary between said user and said web service;
   determining a set of access information data comprising binding information and data indicating different access possibilities of how said web service may be accessed, wherein the set of access information data includes network management information obtained from at least one proxy server and stored in a network management application, said network management application comprising a data collector which collects network management information from said at least one proxy server, each of said at least one proxy server comprising a probe which measures and stores said network management information, said network management information comprising response times and availability of said at least one proxy server;
   caching first information from said web service at said at least one proxy server, said caching of said first information performed at said response times while said web service is available;
   determining said response times of said at least one proxy server that is available;
   evaluating different access possibilities indicated by said set of access information data using said response times and availability of said at least one proxy server, said different access possibilities comprising one or more service paths, wherein said evaluating of said different access possibilities is based on graph-theoretical algorithms;
   determining a service path of said one or more service paths to access said web service, said determining said service path using the evaluated different access possibilities and service level agreements between said user and said service provider;
   configuring said service path via which said web service is to be accessed;
   accessing said web service; and
   caching second information from said web service at a selected proxy server of said at least one proxy server, said caching of said second information based on said response times and said availability of said at least one proxy server.

2. The method of claim 1, wherein the access information data comprises a set of different service paths comprising at least one intermediate server via which the web service may be accessed.

3. The method of claim 1, wherein the access information data comprises a set of different service paths comprising at least one intermediate server and binding information.

4. The method of claim 1, wherein evaluations of the access information data are path-cost estimations.

5. The method of claim 1, wherein a web service is specified in a web service description language (WSDL).

6. A computer program product which is in the form of a non-transitory computer-readable storage medium with program code for accessing a web service using a service client in an IT-network stored on it, wherein the program code, when executed on a computer system, is configured to:
   receive a request from a user for said web service at a service gateway, said service gateway located on said service client acting as an intermediary between said user and said web service;
   determine a set of access information data comprising binding information and data indicating different access possibilities of how said web service may be accessed, wherein the set of access information data includes network management information obtained from at least one proxy server and stored in a network management application, said network management application comprising a data collector which collects network management information from said at least one proxy server, each of said at least one proxy server comprising a probe which measures and stores said network management information, said network management information comprising response times and availability of said at least one proxy server;
   cache first information from said web service at said at least one proxy server, said caching of said first information performed at said response times while said web service is available;
   determine said response times of said at least one proxy server that is available;
   evaluate different access possibilities indicated by said set of access information data using said response times and availability of said at least one proxy server, said different access possibilities comprising one or more service paths, wherein said evaluating of said different access possibilities is based on graph-theoretical algorithms;
   determine a service path of said one or more service paths to access said web service, said determining said service path using the evaluated different access possibilities and service level agreements between said user and a service provider;
   configure said service path via which said web service is to be accessed;
   access said web service; and
   cache second information from said web service at a selected proxy server of said at least one proxy server, said caching of said second information based on said response times and said availability of said at least one proxy server.

7. A computer program product which is in the form of a non-transitory computer-readable storage medium with program code stored on it, wherein the program code is arranged to carry out a method, when executed on a computer system, of accessing a web service using a service client in an IT-network, the method comprising:

receiving a request from a user for said web service at a service gateway, said service gateway located on said service client acting as an intermediary between said user and said web service;

determining a set of access information data comprising binding information and data indicating different access possibilities of how said web service may be accessed, wherein the set of access information data includes network management information obtained from at least one proxy server and stored in a network management application, said network management application comprising a data collector which collects network management information from said at least one proxy server, each of said at least one proxy server comprising a probe which measures and stores said network management information, said network management information comprising response times and availability of said at least one proxy server;

caching first information from said web service at said at least one proxy server, said caching of said first information performed at said response times while said web service is available;

determining said response times of said at least one proxy server that is available;

evaluating different access possibilities indicated by said set of access information data using said response times and availability of said at least one proxy server, said different access possibilities comprising one or more service paths, wherein said evaluating of said different access possibilities is based on graph-theoretical algorithms;

determining a service path of said one or more service paths to access said web service, said determining said service path using the evaluated different access possibilities and service level agreements between said user and a service provider;

configuring said service path via which said web service is to be accessed;

accessing said web service; and caching second information from said web service at a selected proxy server of said at least one proxy server, said caching of said second information based on said response times and said availability of said at least one proxy server.

* * * * *